United States Patent
Morrissey et al.

(10) Patent No.: US 9,494,259 B2
(45) Date of Patent: *Nov. 15, 2016

(54) RIGID DISPOSABLE FLOW PATH

(71) Applicant: EMD Millipore Corporation, Billerica, MA (US)

(72) Inventors: Martin Morrissey, Beverly, MA (US); Neil Schauer, Milford, MA (US)

(73) Assignee: EMD Millipore Corporation, Billerica, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/074,815

(22) Filed: Nov. 8, 2013

(65) Prior Publication Data
US 2014/0090738 A1 Apr. 3, 2014

Related U.S. Application Data

(62) Division of application No. 13/170,926, filed on Jun. 28, 2011, now abandoned.
(Continued)

(51) Int. Cl.
F16L 9/127 (2006.01)
F16L 9/00 (2006.01)
(Continued)

(52) U.S. Cl.
CPC .............. *F16L 9/00* (2013.01); *B01J 19/0093* (2013.01); *B01L 3/502707* (2013.01);
(Continued)

(58) Field of Classification Search
CPC ............ F16L 9/128; F16L 9/133; F16L 9/121; F16L 9/123; B01L 3/502707; B01L 3/502715
(Continued)

(56) References Cited

U.S. PATENT DOCUMENTS 1,608,905 A 11/1926 Murray et al.
1,649,752 A 11/1927 Stone
(Continued)

FOREIGN PATENT DOCUMENTS

CN 1867797 A 11/2006
FR 2954367 A1 6/2011
(Continued)

OTHER PUBLICATIONS

International Search Report and Written Opinion received for PCT Application No. PCT/US2011/042188 mailed on Nov. 17, 2011, 15 pages.
(Continued)

Primary Examiner — J. Casimer Jacyna
(74) Attorney, Agent, or Firm — EMD Millipore Corporation

(57) ABSTRACT

A disposable flow path having a manifold system that provides pressure resistance for the disposable device. The disposable device is comprised of a first rigid plastic sheet and a second rigid plastic sheet. Each sheet has two major surfaces and a thickness between them. At least one sheet surface has flow channels formed in it. The flow channels extend away from a first major surface and beyond the normal plane of a second major surface of the sheet. The sheets are liquid tightly sealed to each other at their adjoining first major surfaces. When each sheet contains a flow channel, the flow channels are aligned and in register with each other. One or more fittings can be secured in the flow channel(s) at an edge of the two liquid tightly sealed sheets. Alternatively, tubing is placed in the channels before the sheets are secured to one another.

11 Claims, 7 Drawing Sheets

Related U.S. Application Data

Figure 1:
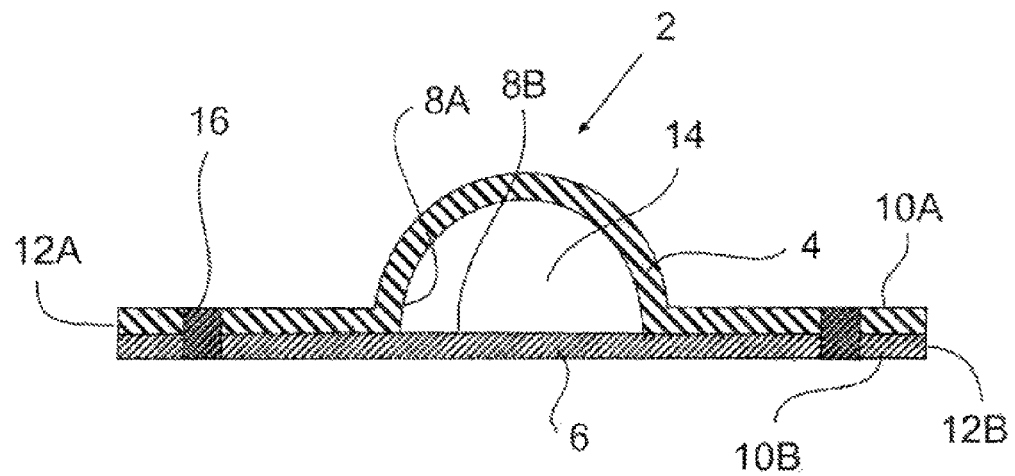

(60) Provisional application No. 61/360,644, filed on Jul. 1, 2010.

(51) Int. Cl.
*F16L 9/133* (2006.01)
*F16L 9/22* (2006.01)
*B01L 3/00* (2006.01)
*B01J 19/00* (2006.01)

(52) U.S. Cl.
CPC .......... *B01L 3/502715* (2013.01); *B01L 3/561* (2013.01); *F16L 9/127* (2013.01); *F16L 9/133* (2013.01); *F16L 9/22* (2013.01); *B01J 2219/00783* (2013.01); *B01J 2219/00808* (2013.01); *B01J 2219/00813* (2013.01); *B01J 2219/00833* (2013.01); *B01J 2219/00968* (2013.01); *B01L 2200/027* (2013.01); *B01L 2200/0689* (2013.01); *B01L 2300/0887* (2013.01); *Y10T 137/87153* (2015.04)

(58) Field of Classification Search
USPC ......... 138/177, 114, DIG. 11, 111, 140, 156, 138/170, 171, 109
See application file for complete search history.

(56) References Cited

U.S. PATENT DOCUMENTS

| | | | |
|---|---|---|---|
| 2,624,366 A * | 1/1953 | Pugh | B29D 23/001 138/115 |
| 3,086,559 A | 4/1963 | Grenell et al. | |
| 3,485,245 A * | 12/1969 | Terwilliger et al. | 604/114 |
| 3,996,968 A | 12/1976 | Bergman et al. | |
| 4,297,891 A | 11/1981 | Falcon | |
| 4,572,430 A | 2/1986 | Takagi et al. | |
| 4,615,411 A | 10/1986 | Breitscheidel et al. | |
| 4,629,479 A | 12/1986 | Cantoni | |
| 4,874,646 A | 10/1989 | Tsujino et al. | |
| 5,358,011 A * | 10/1994 | Stockton | G02B 6/4459 138/103 |
| 5,390,704 A | 2/1995 | Kanao | |
| 5,996,633 A | 12/1999 | Kato | |
| 6,041,829 A | 3/2000 | Chancellor | |
| 6,471,855 B1 | 10/2002 | Odak et al. | |
| 6,712,925 B1 | 3/2004 | Holl et al. | |
| 2002/0145309 A1 | 10/2002 | Shikata et al. | |
| 2003/0075227 A1* | 4/2003 | Lepoutre | F02M 35/10137 138/119 |
| 2007/0203300 A1 | 8/2007 | Sumi et al. | |
| 2007/0278155 A1 | 12/2007 | Lo et al. | |
| 2009/0041624 A1 | 2/2009 | Hochmuth et al. | |
| 2009/0182275 A1 | 7/2009 | Huddleston | |
| 2009/0192671 A1 | 7/2009 | Bolender et al. | |
| 2010/0018717 A1* | 1/2010 | Espinasse | E21B 17/012 166/346 |
| 2010/0248484 A1 | 9/2010 | Bower et al. | |
| 2011/0073206 A1 | 3/2011 | Na | |
| 2012/0000566 A1 | 1/2012 | Morrissey et al. | |

FOREIGN PATENT DOCUMENTS

| | | |
|---|---|---|
| JP | 52-037616 U | 3/1977 |
| JP | 53-041780 U | 4/1978 |
| JP | 53-41780 Y2 | 10/1978 |
| JP | 54-29409 U | 2/1979 |
| JP | 58-196489 U | 12/1983 |
| JP | 63-313028 A | 12/1988 |
| WO | 2009/017614 A1 | 2/2009 |
| WO | 2012/003185 A1 | 1/2012 |

OTHER PUBLICATIONS

International Preliminary Report on Patentability received for PCT Patent Application No. PCT/US2011/042188, mailed on Jan. 17, 2013, 9 pages.

* cited by examiner

RIGID DISPOSABLE FLOW PATH

CROSS-REFERENCE TO RELATED APPLICATIONS

The present application is a Divisional Patent Application of U.S. application Ser. No. 13/170,926, filed on Jun. 28, 2011, which claims the benefit of priority of U.S. Provisional Patent Application No. 61/360,644, filed on Jul. 1, 2010, the entire content of each is incorporated by reference herein in their entirety.

This invention relates to a rigid disposable flow path for disposable manufacturing such as in pharmaceutical, biopharmaceutical, nutriceutical, food or beverage processing and the like. Moreover the invention relates to a rigid top and bottom portion attached to each other with a flow path formed in the adjoining faces of the top and bottom portion.

BACKGROUND OF THE INVENTION

Traditionally, fluid products such as biopharmaceuticals, food and beverages have been processed in stainless steel path ways. The steel piping and fluid path ways need to cleaned such as with a hot caustic solution and then rinsed with several volumes of hot water and steam sterilized in between each use.

One problem with such a system is making sure the system is properly cleaned and sterilized in between each use. Another issue is that the system is incapable of being flexible in size or configuration, limiting the user to a set volume and methodology dictated by the configuration.

This has led to the recent adoption of plastic flexible containers and systems based on them. Most simply are plastic assemblies such as bags connected to each other by plastic tubing. One problem with such systems is that the system cannot be used at any high pressures due to the limitations of the plastic itself. A second issue is that it needs to be stabilized or retained to the surface on which it is used.

One approach has been to use a clam shell or two piece manifold having a flow channel configuration or a relatively flat compressible surface between which the tubing of an assembly and/or the entire assembly can be held so that it can be kept in place and provided with some pressure resistance. See WO 2009/017614.

Another option is to use as flat or unconfigured bag and manifolds that contain the desired flow channels in the manifolds. The bag is placed between the manifolds and slightly constrained. The bag portions corresponding to those portions below the flow channels of the bag are then slightly inflated with a gas or liquid such that the bag portions fill the flow channels of the manifolds. The manifolds are then closed around the bag forming the desired flow path within the bag while in the manifolds, See FR 0959435 filed Jan. 23, 2009.

These devices have their limitations in terms of their complexity of operation and manufacture and their potential for leakage at pressure. For example, the use of separate components such as bags and tubes or an unconfigured bag and placing them in a manifold still limits one to the pressures at which the device may be run as the bag and often the tubes pressure resistance is only marginally improved by the use of the shell or manifolds. This is even more accentuated in the system using only a bag and forming the fluid pathways by inflating portions of the bag into the channels formed in the manifold inner surfaces. In this instance, the seal between the layers of the bag limits the amount of pressure that can be used. Additionally, when using individual components such as tubes connected to bags through a plastic port welded to the bag, one has to deal with obtaining and maintaining a good liquid tight seal between all the components. Most often a leak will occur where the tube is secured to the bag. The manifold devices do not stop such leaks from occurring and running the system at higher pressure and exacerbate the leak in some instances.

The present invention provides a different device for forming a disposable pathway that is capable of holding and operating at high pressures and eliminating the leaks that may occur in other assemblies.

SUMMARY OF THE INVENTION

The present invention provides a disposable rigid flow path which by itself or in conjunction with a clam shell or manifold system provides additional pressure resistance for the disposable device.

In a first embodiment, the device is comprised of a first sheet of rigid plastic material and a second sheet of plastic material. Each sheet has a first major surface and a second major surface and a thickness between the first and second major surfaces. At least one and preferably both have flow channels formed in them. The flow channels are formed in the sheet (s) in manner such that the area of the sheet where the flow channels are formed extend away from the first major surface of the sheet and beyond the normal plane of the second major surface of the sheet. The first and second sheets are liquid tightly sealed to each other at their adjoining first major surfaces. In the embodiment where each sheet contains a flow channel, the flow channels of the two sheets are aligned and in register with each other. One or more fittings are secured in the flow channel(s) at an edge of the two liquid tightly sealed sheets so as to function as an inlet, outlet or other port for the system.

In a second embodiment, the device is comprised of a first sheet of rigid plastic material and a second sheet of plastic material. Each sheet has a first major surface and a second major surface and a thickness between the first and second major surfaces. Both sheets have flow channels formed in them. The flow channels are formed in the sheets in a manner such that the area of the sheet where the flow channels are formed extends away from the first major surface of the sheet and beyond the normal plane of the second major surface of the sheet. The first and second sheets are liquid tightly sealed to each other at their adjoining first major surfaces. The flow channels of the two sheets are aligned and in register with each other. A tubing is run in the flow channels between the two sheets and one or more fittings are secured to the tubing in the flow channels at an edge of the two liquid tightly sealed sheets so as to function as an inlet, outlet or other port for the system.

It is an object of the present invention to provide a device is comprised of a first sheet of rigid plastic material and a second sheet of plastic material, each sheet has a first major surface and a second major surface and a thickness between the first and second major surfaces at least one and preferably both sheets have one or more flow channels formed in them, the flow channels are formed in the sheet (s) in a manner such that the area of the sheet(s) where the one or more flow channels are formed extend away from the first major surface of the sheet(s) and beyond the normal plane of the second major surface of the sheet(s), the first and second sheets are liquid tightly sealed to each other at their adjoining first major surfaces and one or more fittings are secured in the flow channel(s) at an edge of the two liquid tightly sealed sheets so as to function as a port for the device.

It is an object of the present invention to provide a device is comprised of a first sheet of rigid plastic material and a second sheet of plastic material, each sheet has a first major surface and a second major surface and a thickness between the first and second major surfaces at least one and preferably both sheets have one or more flow channels formed in them, the flow channels are formed in the sheet (s) in a manner such that the area of the sheet(s) where the one or more flow channels are formed extend away from the first major surface of the sheet(s) and beyond the normal plane of the second major surface of the sheet(s), the first and second sheets are liquid tightly sealed to each other at their adjoining first major surfaces, one or more pieces of tubing are in the one or more flow channels between the two sheets and one or more fittings are secured to the tubing in the flow channels at an edge of the two liquid tightly sealed sheets so as to function as a port for the device.

It is an object of the present invention to provide an embodiment in which each sheet contains one or more flow channels and the flow channels of the two sheets are aligned and in register with each other.

It is an object of the present invention to provide a device wherein the first sheet has one more flow channels and the one or more flow channels have a cross-sectional profile selected from the group consisting of semi-circles, semi-ovals, squares, triangles, rectangangles, semi-hexagonals and semi-polygonals where p equals the number of sides of the polygon and p>6.

It is an object of the present invention to provide a device wherein the first and second sheets have one or more flow channels in them and the one or more flow channels have a cross-sectional profile selected from the group consisting of semi-circles, semi-ovals, squares, triangles, rectangangles, serni-hexagonals and semi-polygonals where p equals the number of sides of the polygon and p>4.

It is an object of the present invention to provide a device wherein the sheets are made from a plastic selected from the group consisting of polyolefins, polycarbonates, epoxies, fiberglass reinforced thermosets, carbon reinforced thermosets, carbon composites, polysulphones and polyetherimides.

It is an object of the present invention to provide a device wherein the sheets are liquid tightly sealed together by a means selected from the group consisting of heat bonds, ultra-sonic welding, vibration welding, heat-staking, solvent welding, adhesives, clamps, nuts and bolts and the like.

It is an object of the present invention to provide a device having one or more holes through one of the first or second sheets at a location over the one or more flow channels and a sensor being liquid tightly attached to the opening.

It is an object of the present invention to provide a device having one or more holes through one of the first or second sheets at a location over the one or more flow channels, each opening having a elastomeric seal formed therein and a sensor being liquid tightly attached to the opening.

It is an object of the present invention to provide a device having one or more holes through one of the first or second sheets at a location over the one or more flow channels, a sensor being liquid tightly attached to the opening and the sensor being selected from the group consisting of temperature, pressure, conductivity, flow and pH sensors.

IN THE DRAWINGS

Figure 2:
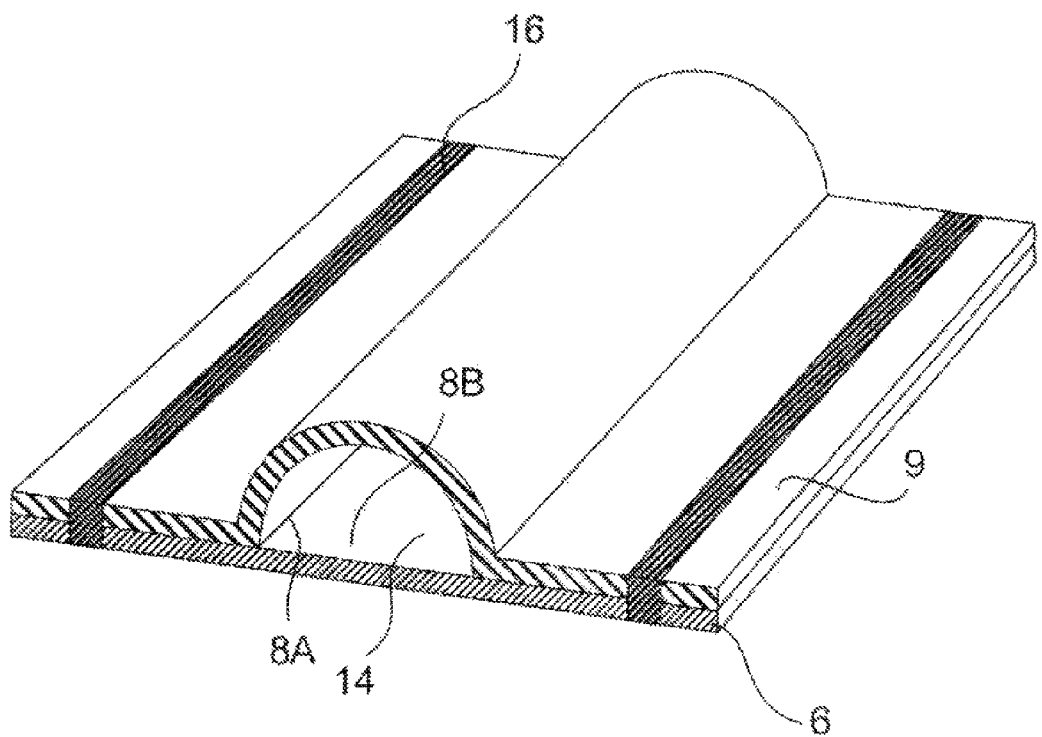
Figure 3:
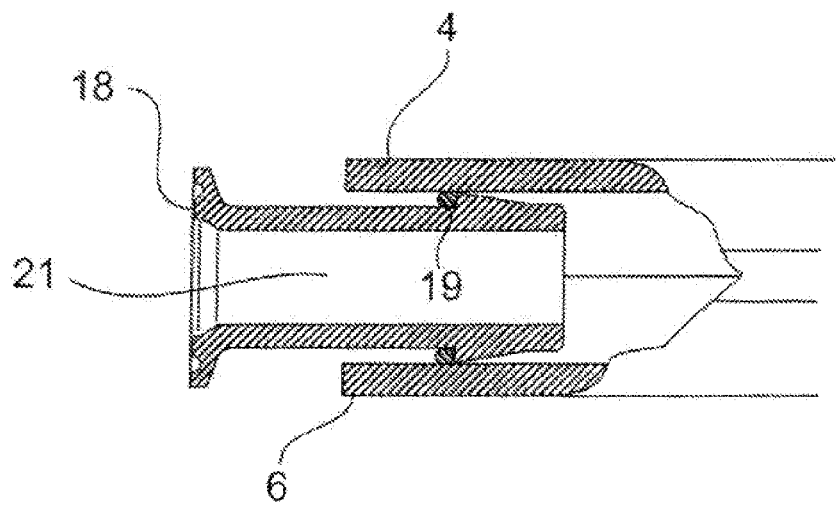
Figures 4A, 4B, 4C, 4D, 4E, 4F:
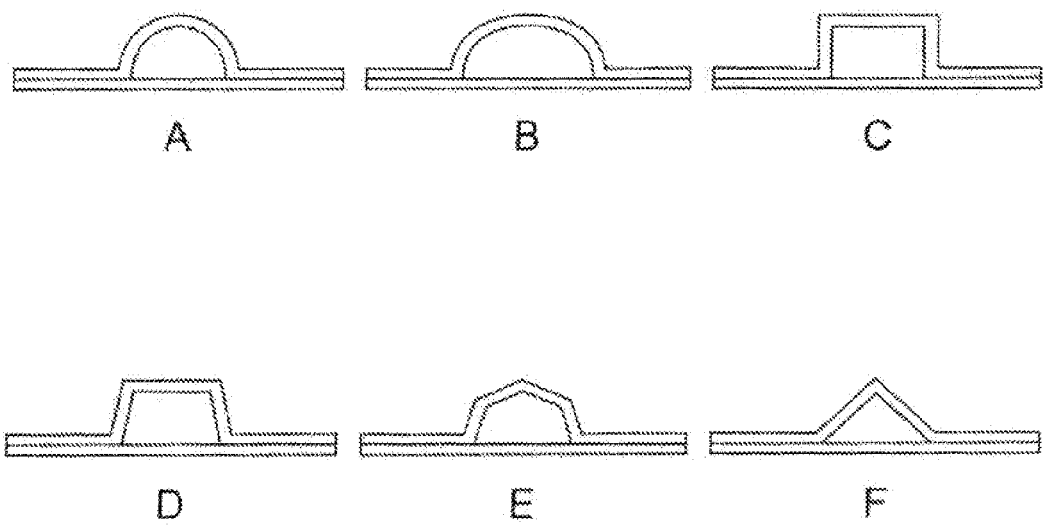
Figure 5:
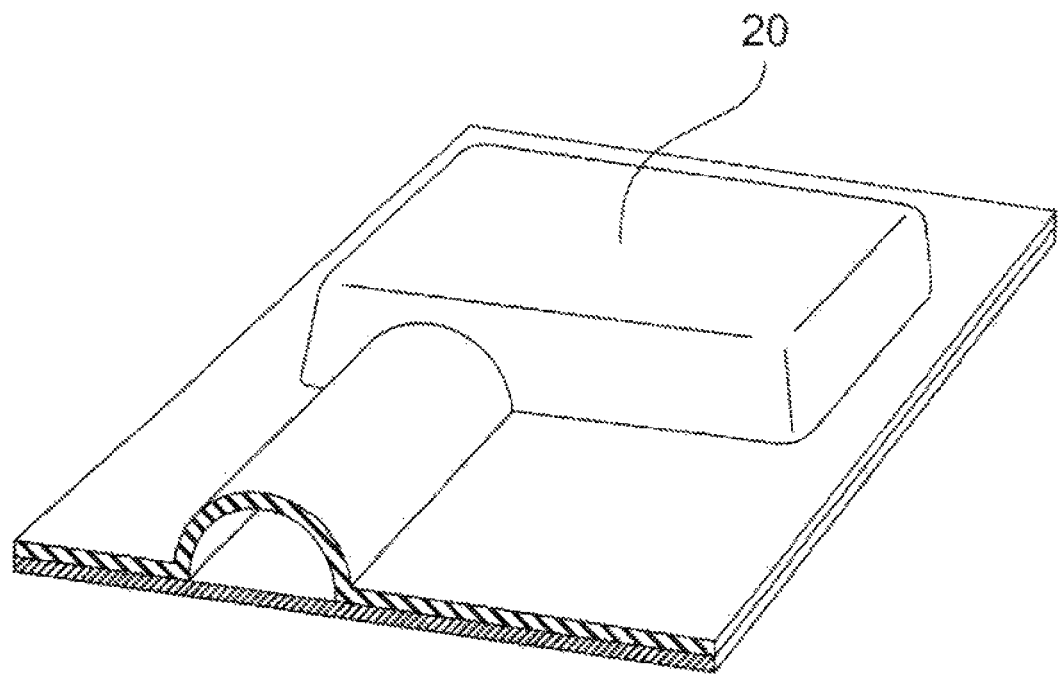
Figure 6:
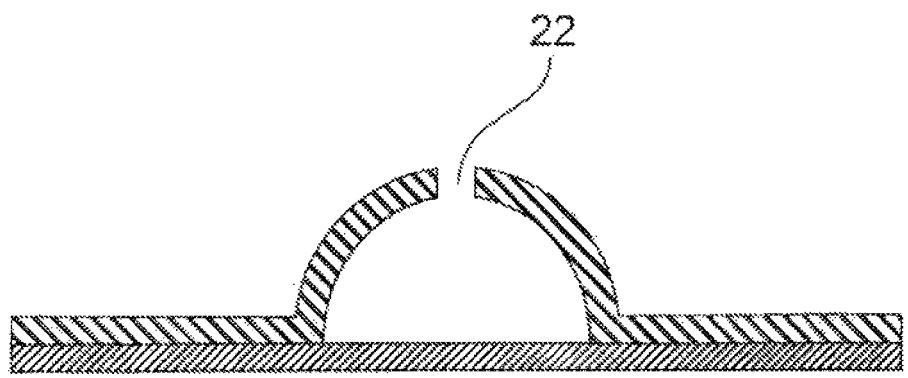
Figure 7:
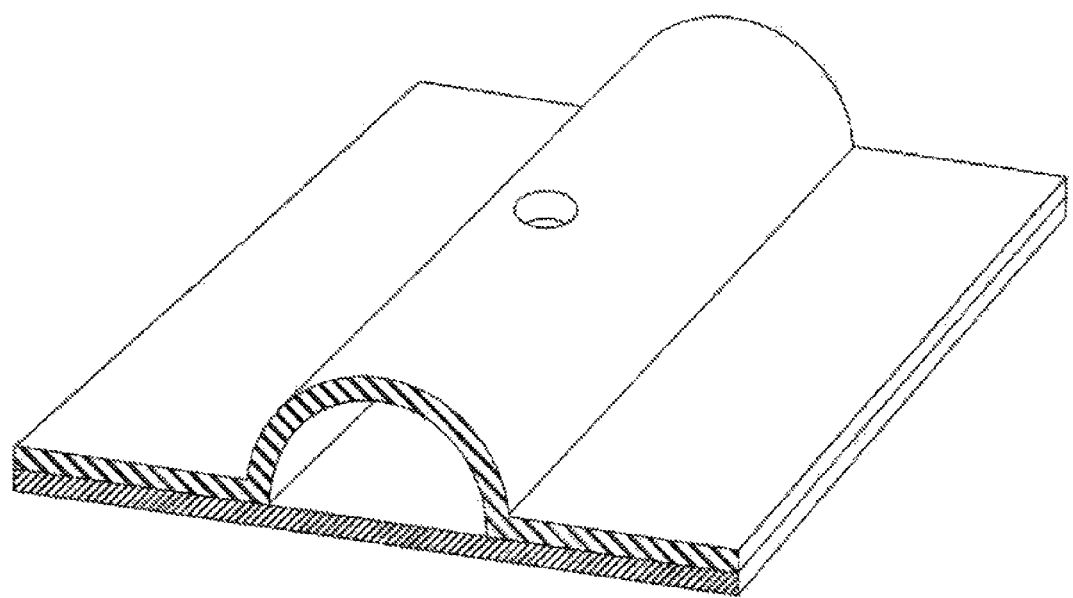
Figure 8:
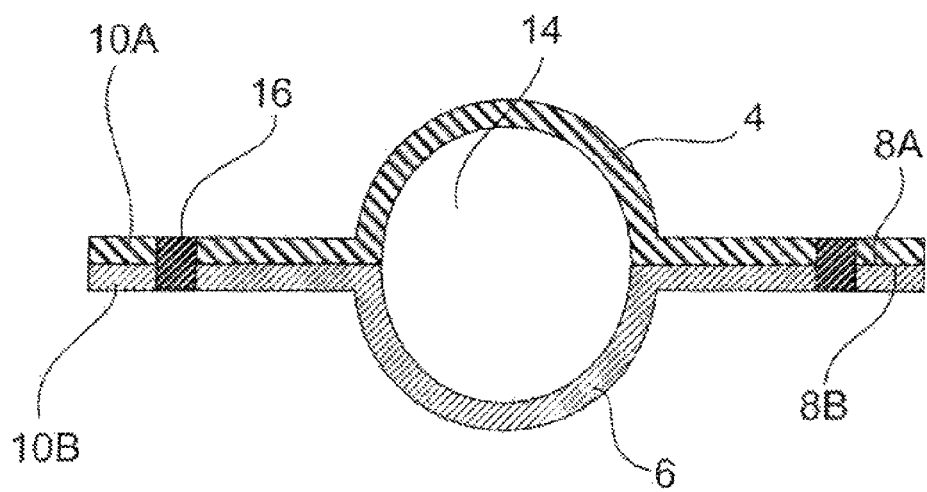
Figure 9:
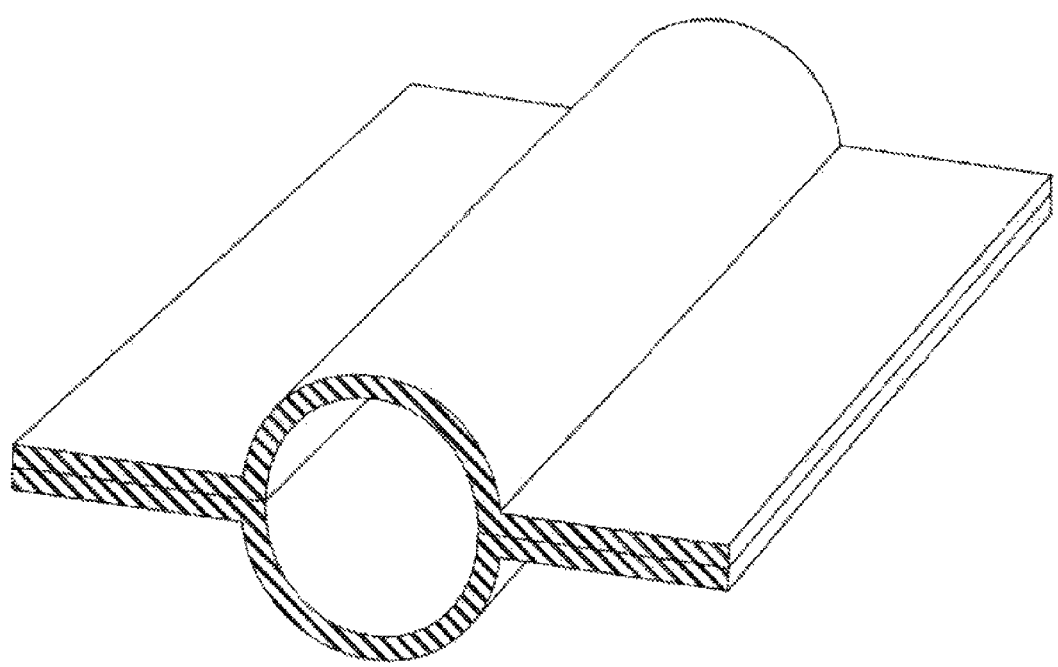
Figure 10:
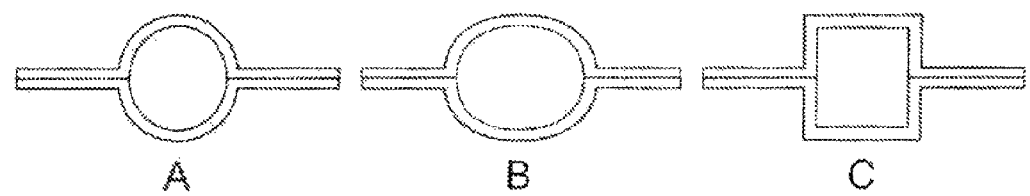
Figure 10:
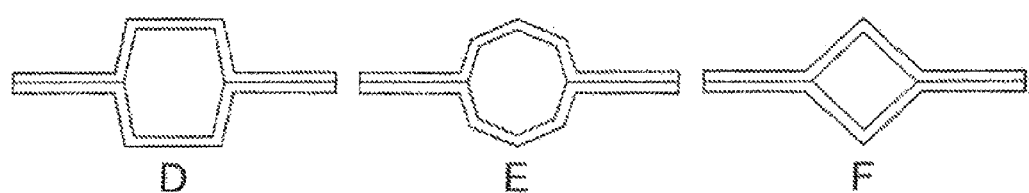
Figure 11:
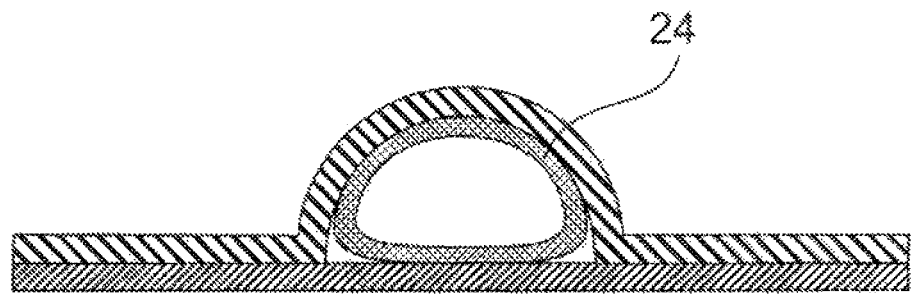
Figure 12:
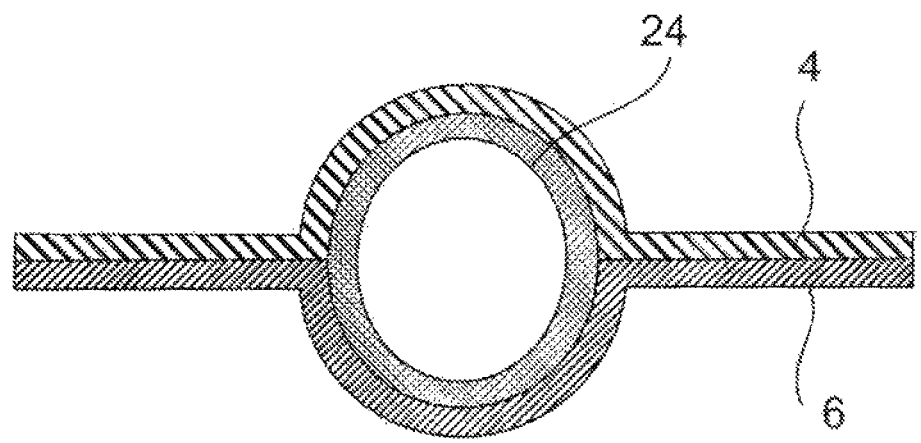
Figure 13:
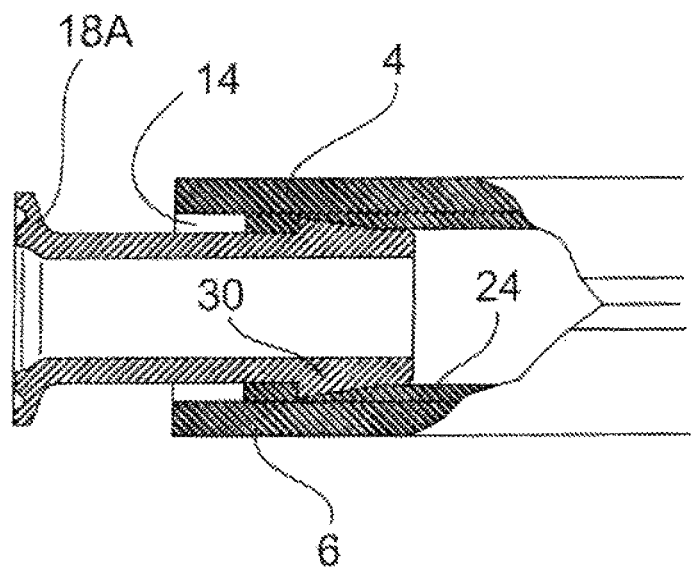

FIG. 1 shows a first embodiment in cross-section view.
FIG. 2 shows the first embodiment of FIG. 1 in planar view.
FIG. 3 shows the first embodiment of FIG. 1 in a second cross-sectional view with a fitting attached.
FIG. 4 A-F shows some of the various cross-sectional profiles of the flow channels of the first embodiment.
FIG. 5 shows the first embodiment in planar view.
FIGS. 6 and 7 show a sensor port of the present invention in cross-section view.
FIG. 8 shows a second embodiment of the present invention.
FIG. 9 shows a second embodiment of the present invention.
FIG. 10 A-F shows some of the various cross-sectional profiles of the flow channels of the second embodiment.
FIG. 11 shows a third embodiment of the present invention.
FIG. 12 shows a fourth embodiment of the present invention.
FIG. 13 shows an embodiment and second cross-sectional view with a fitting attached.

DETAILED SPECIFICATION OF THE INVENTION

In FIGS. 1-3 is shown a first embodiment of the present invention. The device 2 is comprised of a first and second sheet of rigid plastic 4, 6. Each sheet 4, 6 has a first major surface 8A and B and a second major surface 10 A and. B and a thickness 12 A and B between the first and second major surfaces 8 and 10 A and 13. In this embodiment only the first sheet 4 has one or more flow channels 14 formed in it. The one or more flow channels 14 are formed in the sheet 4 in a manner such that the area of the sheet 4 where the flow channels 14 are formed extend away from the first major surface 8A of the sheet and beyond the normal plane of the second major surface 10A of the sheet. The first and second sheets 4, 6 are liquid tightly sealed to each other at their adjoining first major surfaces 8A and B. In this embodiment the two sheets are sealed together such as by an adhesive or weld 16 although other methods such as heat bonds, sonic welding, solvent welding, clamps, nuts and bolts and the like can be used instead.

One or more fittings 18 (FIG. 3) are secured in the flow channel(s) 14 at an edge of the two liquid tightly sealed sheets 4, 6 so as to function as a port for the system. If desired a hose barb 30 can be used to secure the fitting to the tubing 24. Alternatively, one can adhere, friction fit or melt bond the fitting 18A to the tubing 24. In this embodiment an O-ring 19 is used to form a liquid tight seal around the outside of the fitting so that all liquid must pass through its bore 21. While shown with the embodiment in which both sheets 4, 6 have a channel 14 as described below, one can use a similar device in the embodiment with only a channel 14 formed in one sheet 4 or 6 as described above in FIGS. 1 and 2.

FIG. 4A-F shows various cross-sectional profiles of the flow channel of the first embodiment. For example the cross-sectional profile can be a semi circle or semi oval as shown in FIG. 4 A and B respectively. Alternatively it can be a triangle (4 F), a square or rectangle (4 C) or any half of a polygon having 5 or more sides. Put another way it can be a semi-polygon wherein the number of sides of the polygon p is greater than 4. Examples of these include a semi-hexagonal profile as shown in 4D and a semi-octagon in 4E.

Optionally, as shown in FIG. 5 the device may have one or more chambers 20 also formed in the first layer that can act as mixing, filtration or storage containers. Additionally, as shown in FIGS. 6 and 7 the device may have one or more holes 22 formed in the one or more flow channels 14 for the attachment of sensors such as those for of temperature, pressure, conductivity, flow and pH sensors or for filter capsules such as Opticap® filters available from Millipore Corporation or for fittings such as hose barbs. Tri-Clovert® clamps and the like so that fluid in the system can be redirected to other devices or locations as needed. These holes 22 may be formed with internal screw threads, elastomer seals or other such devices for the liquid securing of the sensor, filter or fitting. If the sensors are disposable they can permanently secured by adhesives, solvent welds and the like. Optionally, for those sensors that do not need to contact the fluid directly a plastic film or membrane may be sealed across the opening to form a sterile liquid tight barrier (not shown).

FIGS. 8 and 9 show a second embodiment of the present invention in which each sheet has one or more flow paths 14 formed in them. In this instance both sheets have the one or more flow channels 14 formed in each sheet 4, 6 in a manner such that the area of the sheets 4 and 6 where the flow channels 14 are formed extend away from the first major surface 8A or B of each sheet 4, 6 and beyond the normal plane of the second major surface 10A and B of each sheet 4, 6. Preferably the flow channel(s) 14 of each sheet 4, 6 are mirror images of the other so that when the sheets 4, 6 are joined the flow channel(s) 14 of each sheet 4, 6 are in alignment and register with each other, FIG. 10A-F shows various cross-sectional profiles of the flow channel of the second embodiment. For example the cross-sectional profile of each sheet can he a semi circle or semi oval as shown in FIG. 10 A and B respectively. Alternatively it can be a triangle (10 F), a square or rectangle (10 C) or any half of a polygon having 5 or more sides. Put another way it can be a semi-polygon wherein the number of sides of the polygon p is greater than 4. Examples of these include a semi-hexagonal profile as shown in 10D and a semi-octagon in 10E. While the cross-sections of each sheet is shown as being identical to that of the other sheet and while this is the preferred method of doing so, the sheets could if desired have different cross-sectional profiles.

FIG. 11 shows a third embodiment of the present invention. In this embodiment the plastic sheets are formed as in FIGS. 1-3 with one sheet containing the flow channel(s) 14. A flexible tubing 24 such as a rubber or polyolefinic tube is inserted into the flow channel(s) 14 before the two sheets 4, 6 are attached to each other. Such tubes are well known in the industry and may be made of silicone, polyethylene, poly propylene, C-Flex® polymer and the like. If desired the tubing may have reinforcement such as a braid of fiberglass or metal to add additional pressure resistance to it.

FIG. 12 shows a fourth embodiment of the present invention. In this embodiment the plastic sheets are formed as in FIGS. 8-9 with each sheet 4, 6 containing the flow channel(s) 14. A flexible tubing 24 such as a rubber or polyolefinic tube is inserted into the flow channel(s) 14 before the two sheets 4, 6 are attached to each other. Such tubes are well known in the industry and may be made of silicone, polyethylene, polypropylene, C-Flexa® polymer and the like. If desired the tubing may have reinforcement such as a braid of fiberglass or metal to add additional pressure resistance to it.

FIG. 13 shows a fitting 18A in the tubing 24 contained within the flow channel 14. If desired a hose barb 30 can be used to secure the fitting to the tubing 24. Alternatively, one can adhere, friction fit or melt bond the fitting 18A to the tubing 24. While shown with the embodiment in which both sheets 4, 6 have a channel 14, one can use a similar device in the embodiment with only a channel 14 formed in one sheet 4 or 6.

The sheets can be made from a plastic selected from the group consisting of polyolefins, polycarbonates, epoxies, fiberglass reinforced thermosets, carbon reinforced thermosets, carbon composites, polysulphones and polyetherimides.

The one or more flow channels can be formed in the rigid plastic sheet(s) in a variety of manners. For example it can be vacuum formed by preparing a pattern of the flow channel configuration on a mold, heating the plastic sheet until it is soft and then applying a vacuum to the plastic sheet so as to pull it against the pattern and form the channel configuration. Alternatively, if the plastic thick enough it may be formed by removing the plastic in the areas of the desired flow path such as by a router or a CNC milling machine, a laser or chemical etching. In another embodiment, the plastic is melt cast or solvent cast over a pattern containing the pattern of the flow channel configuration (either as a positive or a negative pattern) and it is allowed to cool or evaporate the solvent. For thermosets, a similar process may be used and the thermoset is allowed to cure or set against the pattern to form the device.

The holes 22 may he darned as part of the process of making the sheets such as when the sheets are cast or they may be formed afterward such as by drilling or laser etching the hole in the desired location.

Once formed, the two sheets are aligned and securely held together in a liquid tight manner. This may be accomplished by adhesives that hold the two sheets together, or by solvents that selectively dissolve a portion of the adjoining plastic of each sheet and welds the two together as the solvent is evaporated. Heat sealing and heat or sonic or ultrasonic welding can also be used. Lasers and heat platens can be used for the heat welding. Alternatively, the two sheets can be secured by clamps around their edges. This may in some instances necessitate the use of a peripheral gasket. Likewise, a series of nuts and bolts or rivets, optionally with a peripheral gasket can be used to seal the sheets together.

At the edge of the sheets where the flow channel exits or enter the sheets, one can mount a fitting to the opening to allow for the attachment of tubing, filters, and other such ancillary equipment. In many instances the fitting can be an elastomer material that is simply compressed and held in the flow channel as shown in FIG. 3. Optionally, it may be retained simply by a friction fit between the inner diameter of the flow cannel and the outer diameter of the fitting. The use of adhesives, heat or sonic welding or solvent welding may also be used depending upon the material selected. As shown in FIG. 13, the flow channel(s) 14 may be formed with a retention device such as an undercut 100. While shown as a rectangular undercut, it could be any other shape that retains the fitting.

A device according to the present invention is made in the following manner. A lay out or design of the flow channel is charted and then a mold is formed such as by laying out metal or wood half round pieces. The pieces can be bent or cut to the particular configuration desired. The pieces are attached to a flat surface such as a vacuum board for a vacuform machine. If desired or required, the pieces can be treated with a release agent such as silicone or various machine, mineral or vegetable oils or waxes (natural or synthetic) to ensure the mold does not stick to the plastic sheet. Alternatively a PTFE coating can be applied to the pieces.

A piece of rigid plastic of a size to fit the board is then either simply placed over the board and pieces and then heated such as by a heat lamp or heat gun or the plastic sheet is heated until it is pliable first and then applied to the board. The plastic is clamped in place and a vacuum is drawn to pull the pliable plastic against the mold. The plastic is cooled and released from the board.

If only one sheet is to contain the channel(s), it then secured to a flat sheet of plastic such that the channel(s) is formed at the interface between the faces of the two sheets.

If both sheets are to contain the channel(s) either a second sheet is simply made or if it is complicated a second mold which mirrors the first (ie is reciprocal to the first) is made and a second sheet is formed in a similar manner to the first.

The same type of mold can be used with plastic that is formed from molten material which is poured over the mold or fiberglass or other composites by manufacturing the sheets over the mold(s) and using squeegees or rollers to ensure a good molded surface.

Another method making the device is to simply rout out the channel(s) with a router device or CNC machine or laser or chemical etch as described above.

If the device will contain tubing it is inserted between the sheets before they are secured together. If no separate tubing is used, the end fittings are secured between the sheets before or during when they are secured together. In the case of no separate tubing being in the channel(s), one may warn to wash or flush the channel(s) before use to remove any release agent that may be left. Alternatively, this can be done as each sheet is made.

Once the sheets have been made and secured to each other, the fittings are attached to a supply of liquid and a means to hold the processed material such as a bag, tank, and the like. The liquid is run through the channel(s) and treated such as by a filter that is in line in the device.

What is claimed:

1. A device for the treatment of liquids comprising a first sheet of rigid plastic material and a second sheet of rigid plastic material, each sheet has a first major surface and a second major surface and a thickness between the first and second major surfaces, each of the first and second sheets has one or more flow channels formed therein, the one or more flow channels are formed in each sheet in manner such that the area of the sheet where the one or more flow channels are formed extend away from the first major surface of the sheet and beyond the normal plane of the second major surface of the sheet, the first and second sheets are liquid tightly sealed to each other at their adjoining first major surfaces and one or more pieces of tubing for movement of the liquids are inserted in the one or more flow channels formed between the two sheets, wherein the one or more pieces of tubing substantially conform to the dimension of the flow channels and one or more fittings are secured to the one or more pieces of tubing in the one or more flow channels at an edge of the two liquid tightly sealed sheets.

2. The device of claim 1 further comprising one or more holes formed through at least one of the first or second sheets at a location over the one or more flow channels and a device selected from the group consisting of a sensor, filter and a fitting is liquid tightly attached to each of the one or more holes.

3. The device of claim 1 further comprising one or more holes through one of the first or second sheets at a location over the one or more flow channels, a device selected from the group consisting of a sensor, filter and a fitting being liquid tightly attached to the opening, the device is a sensor and the sensor is selected from the group consisting of temperature, pressure, conductivity, flow and pH sensors.

4. A device for the treatment of liquids comprising a first sheet of rigid plastic material and a second sheet of plastic material, each sheet has a first major surface and a second major surface and a thickness between the first and second major surfaces, each of the first and second sheets has one or more flow channels formed in it, the one or more flow channels are formed in each of the sheets in a manner such that the area of the sheet where the flow channels are formed extends away from the first major surface of the sheet and beyond the normal plane of the second major surface of the sheet, the first and second sheets are liquid tightly sealed to each other at their adjoining first major surfaces, one or more pieces of tubing inserted within the one or more flow channels, wherein the one or more pieces of tubing substantially conform to the dimension of the one or more flow channels, one or more fittings are secured to the one or more pieces of tubing at an edge of the two liquid tightly sealed sheets so as to function as a port for the system and one or more holes formed through at least one of the first or second sheets at a location over the one or more flow channels and a device selected from the group consisting of a sensor, filter and a fitting is liquid tightly attached to the one or more holes.

5. The device of claim 1 further comprising one or more holes formed through at least one of the first or second sheets at a location over the one or more flow channels and a filter being liquid tightly attached to the one or more holes.

6. The device of claim 1 further comprising one or more holes formed through at least one of the first or second sheets at a location over the one or more flow channels and a fitting being liquid tightly attached to the one or more holes.

7. The device of claim 3 wherein the device attached to the one or more holes is a filter.

8. The device of claim 3 wherein the device attached to the one or more holes is a fitting.

9. The device of claim 3 wherein the device attached to the one or more holes is a sensor is selected from the group consisting of temperature, pressure, conductivity, flow and pH sensors.

10. A system for the processing of a liquid comprising a device comprising a first sheet of rigid plastic material and a second sheet of plastic material wherein each sheet is formed of a polycarbonate material, each sheet has a first major surface and a second major surface and a thickness between the first and second major surfaces, each of the first and second sheets has one or more flow channels formed in it, the one or more flow channels are formed in each of the sheets in a manner such that the area of the sheet where the flow channels are formed extends away from the first major surface of the sheet and beyond the normal plane of the second major surface of the sheet, the first and second sheets are liquid tightly sealed to each other at their adjoining first major surfaces, one or more pieces of silicone tubing inserted within the one or more flow channels wherein the one or more pieces of silicone tubing substantially conform to the dimension of the flow channels and a first fitting secured at a first location in the silicone tubing in the one or more flow channels at a first edge of the two liquid tightly sealed sheets and a second fitting secured at a second location in the silicone tubing in the one or more flow channels at a second edge of the two liquid tightly sealed sheets, the first fitting being connected to a supply of liquid for processing and the second fitting being connected to a means to hold the liquid after passing through the tubing contained within the one or more flow channels.

11. The system of claim 10 further comprising one or more holes formed through at least one of the first or second sheets at a location over the one or more flow channels and a device selected from the group consisting of a sensor, filter and a fitting is liquid tightly attached to the one or more holes.

\* \* \* \* \*

UNITED STATES PATENT AND TRADEMARK OFFICE
CERTIFICATE OF CORRECTION

| | |
|---|---|
| PATENT NO. | : 9,494,259 B2 |
| APPLICATION NO. | : 14/074815 |
| DATED | : November 15, 2016 |
| INVENTOR(S) | : Martin Morrissey et al. |

It is certified that error appears in the above-identified patent and that said Letters Patent is hereby corrected as shown below:

In the Claims

In Column 8, Line 34, in Claim 7 delete "claim 3" and insert -- claim 4 --, therefor.

In Column 8, Line 36, in Claim 8 delete "claim 3" and insert -- claim 4 --, therefor.

In Column 8, Line 38, in Claim 9 delete "claim 3" and insert -- claim 4 --, therefor.

Signed and Sealed this
Second Day of May, 2017

Michelle K. Lee
*Director of the United States Patent and Trademark Office*